US011809932B2

(12) United States Patent
Donaldson et al.

(10) Patent No.: US 11,809,932 B2
(45) Date of Patent: Nov. 7, 2023

(54) PRINTED PRODUCTS HAVING MACHINE-READABLE CODE FOR CREATING SECURE LINKS

(71) Applicant: Xerox Corporation, Norwalk, CT (US)

(72) Inventors: Patricia J. Donaldson, Pittsford, NY (US); Stuart Schweid, Pittsford, NY (US); Michael B. Monahan, Webster, NY (US); Roger L. Triplett, Penfield, NY (US); Douglas R. Taylor, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 132 days.

(21) Appl. No.: 17/557,123

(22) Filed: Dec. 21, 2021

(65) Prior Publication Data

US 2023/0196048 A1 Jun. 22, 2023

(51) Int. Cl.
*G06K 19/06* (2006.01)
*G06F 3/12* (2006.01)

(52) U.S. Cl.
CPC ..... *G06K 19/06103* (2013.01); *G06F 3/1222* (2013.01); *G06F 3/1238* (2013.01); *G06F 3/1243* (2013.01); *G06K 19/06178* (2013.01)

(58) Field of Classification Search
CPC ........ G06K 19/06103; G06K 19/06178; G06F 3/1222; G06F 3/1238; G06F 3/1243
See application file for complete search history.

(56) References Cited

U.S. PATENT DOCUMENTS

| 5,530,520 A * | 6/1996 | Clearwater | .............. | H04N 1/34 |
| | | | | 713/176 |
| 8,763,919 B1 * | 7/2014 | Washington | ........... | G06Q 10/10 |
| | | | | 235/494 |
| 8,879,735 B2 | 11/2014 | Lord | | |
| 8,982,391 B2 * | 3/2015 | Burke, Jr. | ............. | G06F 3/1234 |
| | | | | 358/1.9 |
| 9,589,217 B2 | 3/2017 | Eschbach et al. | | |

(Continued)

FOREIGN PATENT DOCUMENTS

WO WO-2016043812 A1 * 3/2016 ....... G06K 19/06103

OTHER PUBLICATIONS

Xerox, Specialty Imaging, "Fraud-Resistant Effects That Protect Your Most Sensitive Documents," https://www.xerox.com/digital-printing/latest/FFSBR-471.pdf, Accessed on Sep. 22, 2021, pp. 1-8.

*Primary Examiner* — Tuyen K Vo
(74) *Attorney, Agent, or Firm* — Gibb IP Law Firm, LLC

(57) ABSTRACT

Access is provided to a variable data printing app and a code detection app on a computer server. The variable data printing app is adapted to add machine-readable code to printable items and create a decoder app capable of decoding the machine-readable code. The code detection app is adapted to receive user identification information and transmit the user identification information to designer devices. The printable items are printed as printed products. The designer devices validate a user device based on the validity of the user identification information. In response, the variable data printing app is adapted to transmit the decoder app to validated user devices. The code detection app, operating on the user device, is adapted to decode the machine-readable code in user-acquired images into an optional secure link with the designer devices.

20 Claims, 7 Drawing Sheets

(56) References Cited

U.S. PATENT DOCUMENTS

| | | |
|---|---|---|
| 9,595,059 B2 | 3/2017 | Knudson et al. |
| 9,628,662 B1 | 4/2017 | Emmett et al. |
| 9,736,330 B2 | 8/2017 | Eschbach et al. |
| 9,934,254 B2 | 4/2018 | Kishi |
| 9,961,230 B2 | 5/2018 | Eschbach et al. |
| 10,452,964 B1 * | 10/2019 | Chapman ......... G06K 19/06037 |
| 10,997,685 B2 | 5/2021 | Rhoads |
| 11,409,977 B1 * | 8/2022 | Glaser .................. G06K 7/1417 |
| 2004/0117627 A1 * | 6/2004 | Brewington ....... H04N 1/32133 |
| | | 713/176 |
| 2007/0019245 A1 * | 1/2007 | Katsurabayashi ... H04N 1/0087 |
| | | 358/3.28 |
| 2007/0177218 A1 * | 8/2007 | Sugawara .......... H04N 1/00846 |
| | | 358/296 |
| 2008/0151288 A1 * | 6/2008 | Matsunoshita .... H04N 1/32144 |
| | | 358/1.15 |
| 2014/0100896 A1 * | 4/2014 | Du ........................ G06Q 10/02 |
| | | 705/5 |
| 2017/0032163 A1 * | 2/2017 | Fukatsu ........... G06K 19/06037 |
| 2020/0357002 A1 | 11/2020 | Caton et al. |

* cited by examiner

PRINTED PRODUCTS HAVING MACHINE-READABLE CODE FOR CREATING SECURE LINKS

BACKGROUND

Systems and methods herein generally relate to printing products and methods and more particularly to uses of machine-readable code on printed products.

Sophisticated printing processes can include hidden marks that make printed product more secure and more useful. For example, checks and other negotiable instruments often use hidden markings to promote authenticity and discourage forgery. Common hidden feature printing techniques include using gloss marks, correlation marks, near-infrared (IR) printing, fluorescence, to mention just a few examples.

SUMMARY

Some methods herein provide access to a variable data printing (VDP) app and a code detection app on a computer server. The variable data printing app is adapted to be accessed by designer devices, add machine-readable code to printable items while operating on the designer devices, and (again, while operating on the designer devices) create a decoder app capable of decoding the machine-readable code.

The variable data printing app is adapted to be accessed by designers using the designer devices preparing the printable items. The machine-readable code can be hidden or can be visible and may form part of decorative elements of the printable items. The machine-readable codes are unreadable by unaided human vision. The variable data printing app is adapted to add the machine-readable codes to the printable items according to the designers' instructions prior to printing the printable items. The printable items are variable information print jobs, and the machine-readable codes are in variable content locations of the variable information print jobs. These methods also print the printable items as printed products using printing equipment that is in communication with the designer devices.

The code detection app is adapted to be accessed by user devices, receive user identification information (and possibly a target URL) while operating on the user devices, and transmit the user identification information to the designer devices while operating on the user devices.

The designer devices validate a user device based on the validity of the user identification information transmitted by the user device. In response, the variable data printing app is adapted to transmit the decoder app to the user device upon validation of the user device.

The user devices are adapted to capture at least one user-acquired image of at least one of the printed products. The code detection app, operating on the user device, is adapted to optionally decode the machine-readable code in the user-acquired image into a secure link with the designer devices using the decoder app. This allows the code detection app to exchange information from the user device to the designer devices using the secure link.

Additional methods herein provide access to a variable data printing app and a code detection app on a computer server. The variable data printing app is adapted to be accessed by designer devices, add machine-readable code to printable items while operating on the designer devices, and (again, while operating on the designer devices) create a decoder app capable of decoding the machine-readable code.

The variable data printing app is adapted to be accessed by designers using the designer devices preparing the printable items. The machine-readable code can be hidden or can be visible and may form part of decorative elements of the printable items. The machine-readable codes are unreadable by unaided human vision. The variable data printing app is adapted to add the machine-readable codes to the printable items according to the designers' instructions prior to printing the printable items. The printable items are variable information print jobs, and the machine-readable codes are in variable content locations of the variable information print jobs.

The code detection app is adapted to be accessed by user devices, receive user identification information while operating on the user devices, and transmit the user identification information to the designer devices while operating on the user devices. The designer devices validate a user device based on the validity of the user identification information transmitted by the user device. In response, the variable data printing app is adapted to transmit the decoder app to the user device upon validation of the user device.

These methods also print the printable items as printed products using printing equipment that is in communication with the designer devices. Such methods can verify the machine-readable code within the printed products using the printing equipment. The user devices are adapted to capture at least one user-acquired image of at least one of the printed products. The code detection app, operating on the user device, is adapted to optionally decode the machine-readable code in the user-acquired image into a secure link with the designer devices using the decoder app. This allows the code detection app to exchange information from the user device to the designer devices using the secure link.

System embodiments herein include a variable data printing app and a decoder app that are adapted to be maintained on a computer server. The variable data printing app is adapted to be accessed by designer devices, add machine-readable code to printable items while operating on the designer devices, and create a decoder app that is capable of decoding the machine-readable code (while operating on the designer devices). The variable data printing app is adapted to be accessed by designers using the designer devices preparing the printable items.

The variable data printing app is adapted to add the machine-readable codes to the printable items according to the designers' instructions prior to printing the printable items. The machine-readable code can be non-visible (unreadable by unaided human vision) or can be visible and may form part of decorative elements of the printable items. The printable items are variable information print jobs, and the machine-readable codes are in variable content locations of the variable information print jobs. The code detection app is adapted to be accessed by user devices, receive user identification information while operating on the user devices, and transmit the user identification information to the designer devices while operating on the user devices. The designer devices validate a user device based on the validity of the user identification information transmitted by the user device. The variable printing app is adapted to transmit the decoder app to validated ones of the user devices while operating on the designer devices. The printable items are adapted to be physically printed as printed products.

The user devices are adapted to capture at least one user-acquired image of at least one of the printed products. The code detection app, operating on the user device, is adapted to optionally decode the machine-readable code in the user-acquired image into a secure link with the designer devices using the decoder app. The code detection app is further adapted to exchange information from the user device to the designer devices using the secure link.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

Figure 1A:
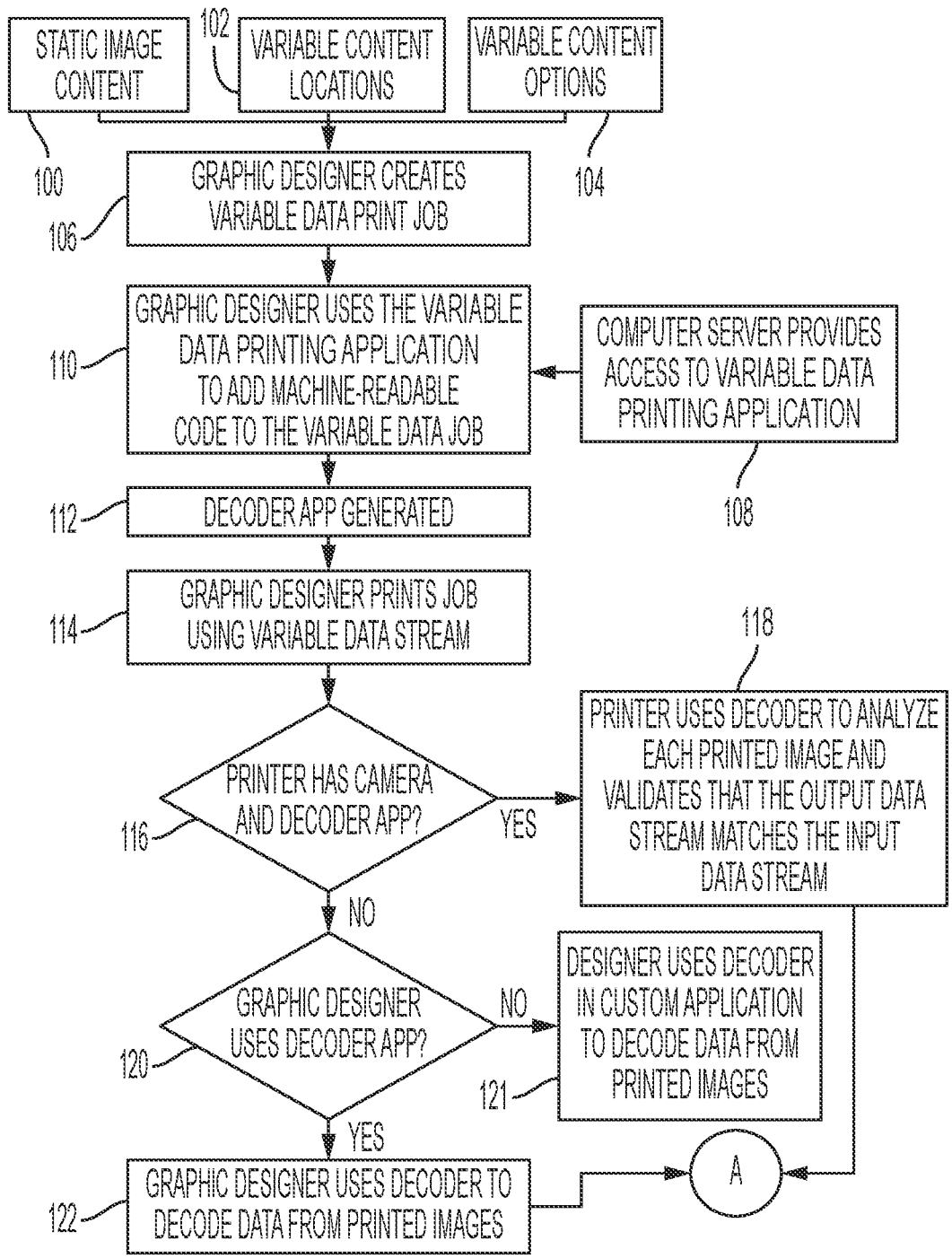
FIGS. 1A-1B illustrate a flow diagram of various methods herein.

As mentioned above, hidden marks can make printed products more secure and more useful. The systems and methods herein use hidden secure features, along with a potentially hidden target URL and user identifying information to minimize the possibility of forgery, copying, or extracting coded information.

Thus, systems and methods herein use encoded visible or hidden features in printed products and provide an application (a computer application, methodology, or automated process is sometimes referred to as an "app" herein) operating on user devices that decodes such encoded features in images of the printed products. The code detection app optionally decodes the encoded features into a secure link that user devices use to securely exchange information.

The systems and methods herein allow a designer to generate coded images using secure print features, and also generate a code detection app for the specific features used. The machine-readable coded features could be a single security feature, such as a correlation mark or a fluorescent mark, or could include multiple security features. The hidden features can be hidden or can be part of visible graphic content (e.g., can be a color pattern that forms part of the image's artwork) that is changed/arranged by processing herein to become machine-readable code, but which is not readable by end-users (even if fully visible). The systems and methods herein have features that help artistic designers create image art/content features that are also machine-readable code.

The code detection app can be downloaded and hosted on a cell phone, or on another device with a built-in camera or other form of image capture device such as a scanner. The code detection application can be preloaded or user loaded with a target URL (web-site, socket/port, internal program) and supplied with user-identifying information. The code detection app can be a generic application that asks users to input both their user ID and a target URL or the code detection app can be URL-specific, in which the code detection app is preloaded with a target URL. The target URL is queried for the decoder app, which is provided only if the user ID is validated.

When the built-in camera system captures an image, the image is scanned for the machine-readable codes. Detected codes are uploaded to the target URL, along with the user-identifying information. The target URL responds in a target URL-dependent manner, based on the user information and code provided. This response may include no indication that a code was detected, for unauthorized users.

Thus, the systems and methods herein use the secure code as part of an application with user-identifying information and a target URL. The systems and methods herein can prevent end-users from creating a copy of the image which would also contain the linked information. The systems and methods herein use variable printing jobs that start with a static image, into which variable content can be placed at specific locations. The incoming data stream contains data for each of the locations at which information can be printed. The variable data job can also specify the font for the content that is to be printed, and that font can be different for each location on the image. This has the ability to reject the font that the designer has selected, if values are not uniquely distinguishable, for example, if the images are circles of different colors, and the colors are too close to each other, or if the designer specifies a font where a lower-case letter "L" is nearly identical to the numeral one or an upper-case letter "i."

The decoder app generated decodes the machine-readable code by processing image elements such as the static portions of the image, the named locations within the image at which data will be inserted, the font used at each location, and the required font. The decoder app may be embodied as a function in a computer language and can be provided, for example, as a dynamic link library.

While the decoder app decodes data from variable data location of an input image, the decoder app first matches static image content to a stored static image to provide proper scale, rotation, etc. Thus, the image may be processed through a number of transformations (e.g., scaled, rotated, etc.) until the static image content matches a stored static image within the decoder app. This matching can ignore any image content at the variable data locations.

Once the image has been matched to the stored static image, the area corresponding to each variable data location is compared to a font image set (decoding key) to determine the best match of each image feature to each corresponding decoded value. The data at each location can be a single value (e.g., a single number linked to a circle of a given color in the input image), or a series of values (a name or address rendered in one of many standard security fonts). The output of the decoder app matches the variable data stream input by the designer when using the variable data printing app and could be a secure link that allows the user to securely communicate with a resource operated by the designer.

For added security, the decoded information may not necessarily be the actual secure link but can be a coded sequence that the code detection app uses to look up the actual link or data referenced. The systems and methods herein can also use the decoder app within a printer that contains a print verification camera so that, as the variable data job is printed, the decoded data stream can be compared and validated against the input data stream.

Thus, the systems and methods herein create a custom decoder app for a variable data input job, which uses static image content to find and interpret variable image data. This is unlike QR codes or bar codes because such codes are industry standards, allowing any application access to publicly available information about these codes, and allowing all systems to decode such codes wherever they are placed and without referring to any aspect of the image in which they are positioned. In contrast, with the systems and methods herein, the codes are unreadable without the decoder app and the decoder app is only provided after the user is verified.

The following illustrative examples show some implementations of the systems and methods herein. In a first example, the systems and methods herein can be used to conduct a movie preview game. In such a game, a movie company may place large format printed posters (or billboards, etc.) in public settings that contain machine-readable codes which is readable (e.g., has elements subject to capture) by the camera of a cell phone.

In one example, the machine-readable codes can be a pattern of color dots that forms a part of the artwork in posters/billboards (e.g., see FIG. 3, discussed below). Unique codes can be placed on each poster, allowing the systems herein to determine the exact poster captured in the user-acquired image. Such a game is generally public and not a secure application, because the machine-readable codes can be large features (especially if printed as billboards, etc.).

With processing herein, the movie company adjusts settings in the code detection app to detect and decode the machine-readable code within the color dots and the movie company can add their own branding to the app. End-users download the code detection app and enter some personal information, such as their name, email, cell-phone number, etc.

The users then proceed around town, searching out poster displays and other advertisements for the upcoming movie as a kind of scavenger hunt. The users operate the camera of their smart phones to obtain (e.g., scan) one or more images of the poster (e.g., by taking pictures, video, etc.). The code detection app decodes the machine-readable code and optionally produces a secure link. The code detection app uses the secure link to allow the user to securely communicate with the movie company's server. Thus, the secure link is produced using the code detection app when the poster, or the correct section of a poster, is identified within an image captured by the user's cell phone camera.

In such a movie preview game it is useful for the machine-readable codes to be a distinct part of the printout (e.g., a pattern of color dots that forms a part of the artwork, as noted above) because large and colorful features have a high probability of being captured and of being detectable in images captured by cameras of cell phones. Cell phone obtained images are notoriously poorly captured images and the use of large and colorful machine-readable code increases the probability that contestants of the movie preview game will be properly recognized.

Different posters of the same image produced for the movie preview game can have slight position, size, and color changes in the relative dot positions and/or dot colors of the machine-readable codes, and this allows each poster to potentially contain a different machine-readable code. However, this slight change from poster to poster would not be easily recognizable to the casual observer as all such patterns of dots have a substantially similar overall appearance.

Further, such codes are generally not human-readable because while some skilled/trained humans may detect that there is a difference between color dot patterns in different printouts of the same image, humans would not be able to decode the color dot patterns into different data because such differences (and the data such differences represent) can be decodable only through a pixel-level analysis that correlates relative X-Y positions of, and different colors of, pixel markings (or lack thereof) with different data elements. In other words, while some humans may be able to recognize that two patterns of dots are different, they would not be able to interpret what such differences mean, nor would they be able to decode the machine-readable codes into data necessary to produce secure links to the movie company's servers.

Such processing is superior to bar codes or quick reference (QR) codes on publicly displayed posters, etc., because such bar codes and QR codes are decoded using open-source specifications that allow the entire population of those who capture the image to access the public link to which the bar code or QR code decodes. In contrast, only the code detection app on the user's device is capable of performing the decoding, only validated users receive the decoder app, and the decoder app relies upon static image portions in the decoding process. This limits the population who can decode the machine-readable code into the secure link to only users that have the code detection app and only code detection app users that meet specific criteria required by the server received second-step decoder app.

This allows the decoded link to be very secure. The additional security afforded by the link facilitates two-way exchange of private or valued information. This also allows different users to receive different responses to captured images of the same public poster. For example, if the user is one of the first people to detect the establish the secure link, they are one of the games "winners" and the code detection app can cause their cell phone to display, for example, a graphic fireworks symbol and text: "Free tickets downloaded to phone!" Subsequent users that establish the secure link may not get free tickets, but may get a special movie preview, get their name added to a visible list of link-finders, etc. Other exemplary rewards could include free tickets to people who found more than a specified number of links, random drawings, special prizes, notification of movie times, etc. The movie company can use the same code detection app to conduct different games for multiple movies over time by updating the code detection app to decode different machine-readable codes for the different movies.

Another exemplary application of these system and methods is physical access control (e.g., to events (festivals), facilities, restricted areas, etc.) using fluorescent ink printed on wristbands, for example. In this example, hidden machine-readable codes (which can be, in this example, printed in the form of barcodes or glyphs) can be printed on festival wristbands using, for example, fluorescent yellow dry ink. Since users pay considerable money for each wristband, the promoter usually verifies that the marks can be read and decoded properly before issuing the wristbands to the customers.

When gaining access to a venue, the wristband is scanned with ultra-violet (UV) light using a UV code reader. The code detection app operating within the UV code reader maintains a database that decodes the machine-readable code. In some implementations, entry can be allowed on this basis alone.

In other options, users may be required to provide a self-captured image (e.g., facial image) when they buy the ticket. With this option, the server also returns to the code detection app the self-captured image (if admission is allowed). Here, the UV code reader can include (or be in communication with) a display screen that displays the self-captured image to allow the gate control agent to confirm that the self-captured image matches the person using the wristband. If the wristband is resold before the event, some systems may allow the self-captured image to be changed to one captured by the resale buyer.

In other options, the UV code reader can include (or be in communication with) a camera that obtains a picture of a customer gaining access during an initial use of a wristband. The facial picture is uploaded to the server securely linked by the app. This allows the first user of the wristband to repeatedly gain access but prevents sharing of wristbands because the picture acquired at initial entry is required to match the customer wearing the wristband on each subsequent entry.

Another exemplary application of these system and methods is a security feature using a machine-readable code in the form of correlation marks printed on an identification (ID) badge. The ID badge also includes human-readable alphanumeric ID text printed thereon. Correlation marks appear as a uniform printed color area of the ID badge until a transparent filter (that is created in conjunction with the correlation marks) is placed over the correlation marks, whereby light interference patterns appearing when the transparent filter is overlaid on the correlation marks cause a hidden code to be revealed through the transparent filter.

The code revealed by placement of the transparent screen on the correlation marks on the ID badge produces an encoded data string. The scanner/reader can read the visible numeric ID on the ID card and can be adapted to include the necessary transparent filter to also optionally produce the secure link (revealed in the correlation marks using the transparent filter). The code detection app operating within a scanner/reader of the light interference patterns decodes the encoded data into an alphanumeric string that should match the alphanumeric ID text printed on the ID badge.

The server site keeps a copy of the same alphanumeric ID text that is printed on the ID badge. These two copies of the alphanumeric ID text must match for access to be granted. This allows the scanner/reader to access the server using the secure link and make the comparison of the alphanumeric ID text on the ID badge to the alphanumeric ID text stored on the server. As with the previous example, the server can also store a facial picture of the user of the ID card and this picture can be sent to the code detection app and displayed on a screen associated with the scanner/reader as another access control feature.

As a further example of systems and methods herein, markings (hidden of visible in artwork) on documents can optionally decode into a secure link that can prove the validity of the document. This allows systems and methods herein to differentiate originals from copies of a secure document (e.g., checks, legal documents, art prints, etc.). In this example, items at multiple stages of document production/processing (e.g., printers, bank processors, etc.) take an image of a document. These items each decode the markings on the document.

Once the code detection app (at each different document production/processing stage) has the secure link, the code detection app uploads the image of the document obtained to the server using the secure link. Each time an image is received by the server, the image and data identifying associated item/processing stage are combined into a block of data. These blocks can be maintained in any form of validation system, such as a blockchain system.

FIG. 1 is flowchart illustrating exemplary methods herein. Items 100, 102, and 104 represent different components of a variable data print job. Specifically, item 100 represents static image content used in one or more images of the print job, item 102 represents variable content locations within the print job, and item 104 represents variable content options for the print job. For example, the static image content 100 is in different image locations from the variable content locations. A graphic designer creates the variable data print job in item 106 by applying selections of the variable content options 104 to the variable content locations 102.

In item 108, these methods provide access to an encoder on a computer server. In item 108 the variable data printing app can be downloaded to the designer devices, or the variable data printing app can be utilized by the designer while being resident on the computer server. The variable data printing app is adapted to be accessed by designer devices, add machine-readable code to printable items while operating on the designer devices, and (again, while operating on the designer devices) create a decoder app capable of decoding the machine-readable code.

Thus, in item 108 the variable data printing app is adapted to be accessed by designers using the designer devices preparing the printable items. The machine-readable code can be hidden or can be visible and may form part of decorative elements of the printable items. The machine-readable codes are unreadable by unaided human vision even if they are visible.

In item 110, the graphic designer uses the variable data printing app to add machine-readable code to the variable data job. The variable data printing app is adapted to add the machine-readable codes to the printable items according to the designers' instructions prior to printing the printable items. More specifically, the information fed to the decoder app is the content (variable content options), the layout (static image content) and the business rules (which include the variable content locations). The variable data print application combines those components with database values to send images to a print device. Thus, the printable items are variable information print jobs, and the machine-readable codes are in variable content locations of the variable information print jobs.

As shown in item 112, the variable data printing app creates a decoder app capable of decoding the machine-readable code. As shown in item 114, these methods also print the printable items as printed products using printing equipment that is in communication with the designer devices.

Decision box 116 determines whether the printer has a camera and the decoder app. If so, in item 118 the printer uses the decoder app to analyze each printed image and validates that the output data stream matches the input data stream.

If the printer does not have the camera or decoder app, processing proceeds to decision box 120 which determines whether the graphic designer will use the decoder app. If not, in item 121 the graphic designer uses the decoder in a custom application to decode data from printed images. If the graphic designer uses the decoder app, in item 122 the graphic designer uses the decoder app to the code the data from the printed image is to confirm that the output data stream matches the input data stream. Processing then flows from items 118 or 122 to bubble A shown in FIG. 1A and to bubble A shown in FIG. 1B.

Figure 1B:
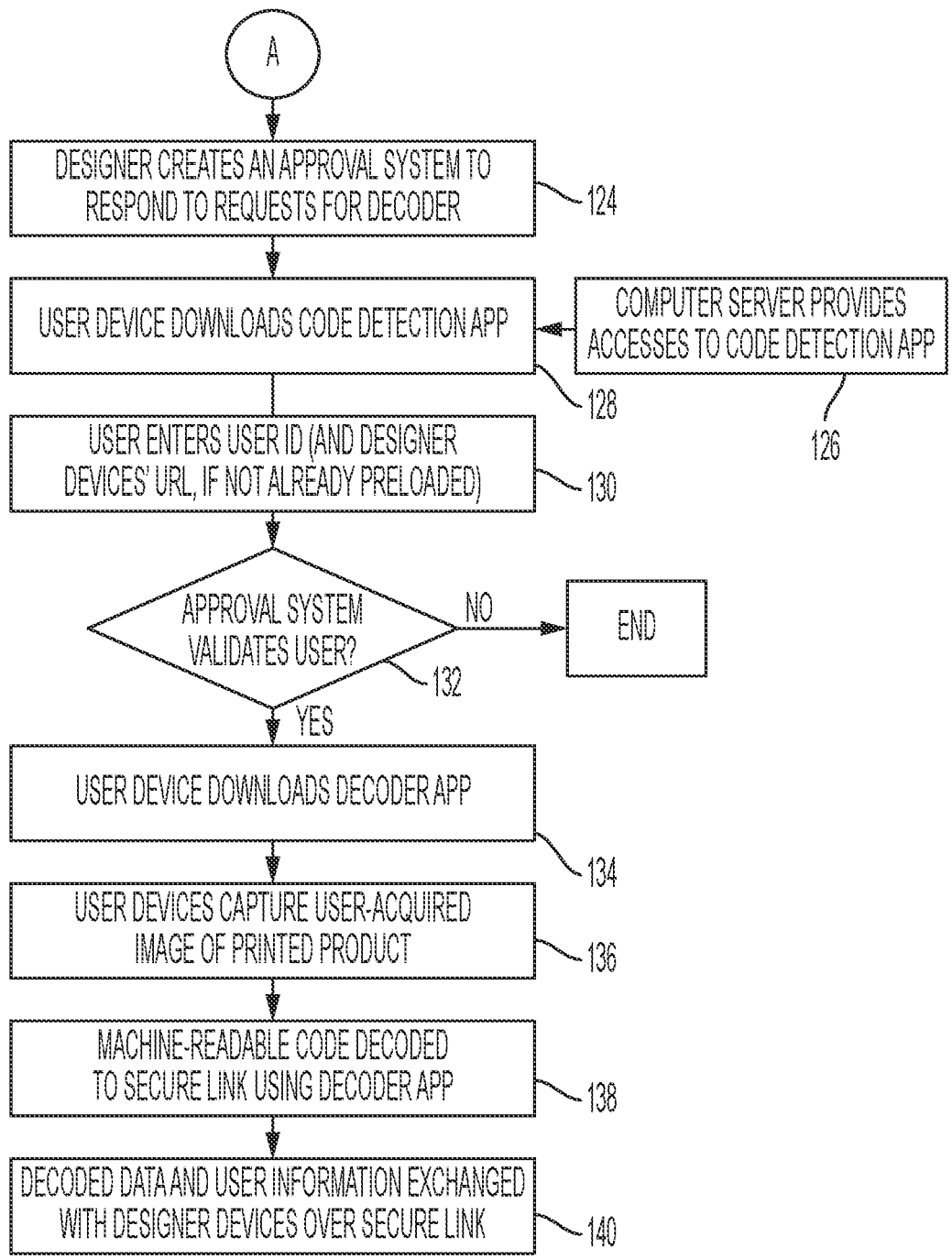

As shown in FIG. 1B, in item 124 the graphic designer creates an approval system to respond to requests for the decoder app. More specifically, the approval system created in item 124 is used to verify whether the user ID supplied by the user device matches an existing previously validated user ID maintained within the designer devices.

As shown in item 126, the computer server provides access to a code detection app. As shown in item 128, the user downloads the code detection app to their device (such as a smart phone, etc.). Additionally, as shown in item 130 the user enters their user ID into the code detection app. If the code detection app has not been previously preloaded with the designer devices URL, the user can also supply the designer device URL to the code detection app. Thus, the code detection app is adapted to be accessed by user devices, receive user identification information while operating on the user devices, and transmit the user identification information to the designer devices while operating on the user devices.

The decision box in item 132 determines whether the approval system has validated the user. Again, the approval system is used to verify whether the user ID supplied by the user device matches an existing previously validated user ID maintained within the designer devices. If validation is unsuccessful, processing ends. However, if validation is successful in item 130, processing proceeds to item 134 where the decoder app is downloaded to the user device.

At some point the user obtains a scan or image of the printed product in item 136. The item obtained through the user device camera or scanner is referred to as a user-acquired image. The machine-readable code in the user-acquired image is optionally decoded into a secure link using the decoder app in item 138.

In item 140, the decoded data and private user information is exchanged with the designer devices over the secure link. In some examples the information that is exchanged with the designer devices over the secure link in item 140 can include data decoded from the machine-readable code that is in addition to the secure link. For example, this additional data can include the user ID of one of the winners in the movie preview game described above. Similarly, this additional data can include data for access to a festival using an encoded wristband (and process attendee pictures, etc.) as described above. Further, this additional data can include data for verification of an ID badge (and processing user ID pictures, etc.) as described above. Also, this additional data can include upload images at each different processing stage to form blocks for a blockchain document authentication system as described above. Note that there are only limited examples and that the information exchanged in item 140 between the user device and the computer server once the secure link is established and such data in not limited to these examples, but instead is broadly applicable to all uses of secure links.

Figure 2:
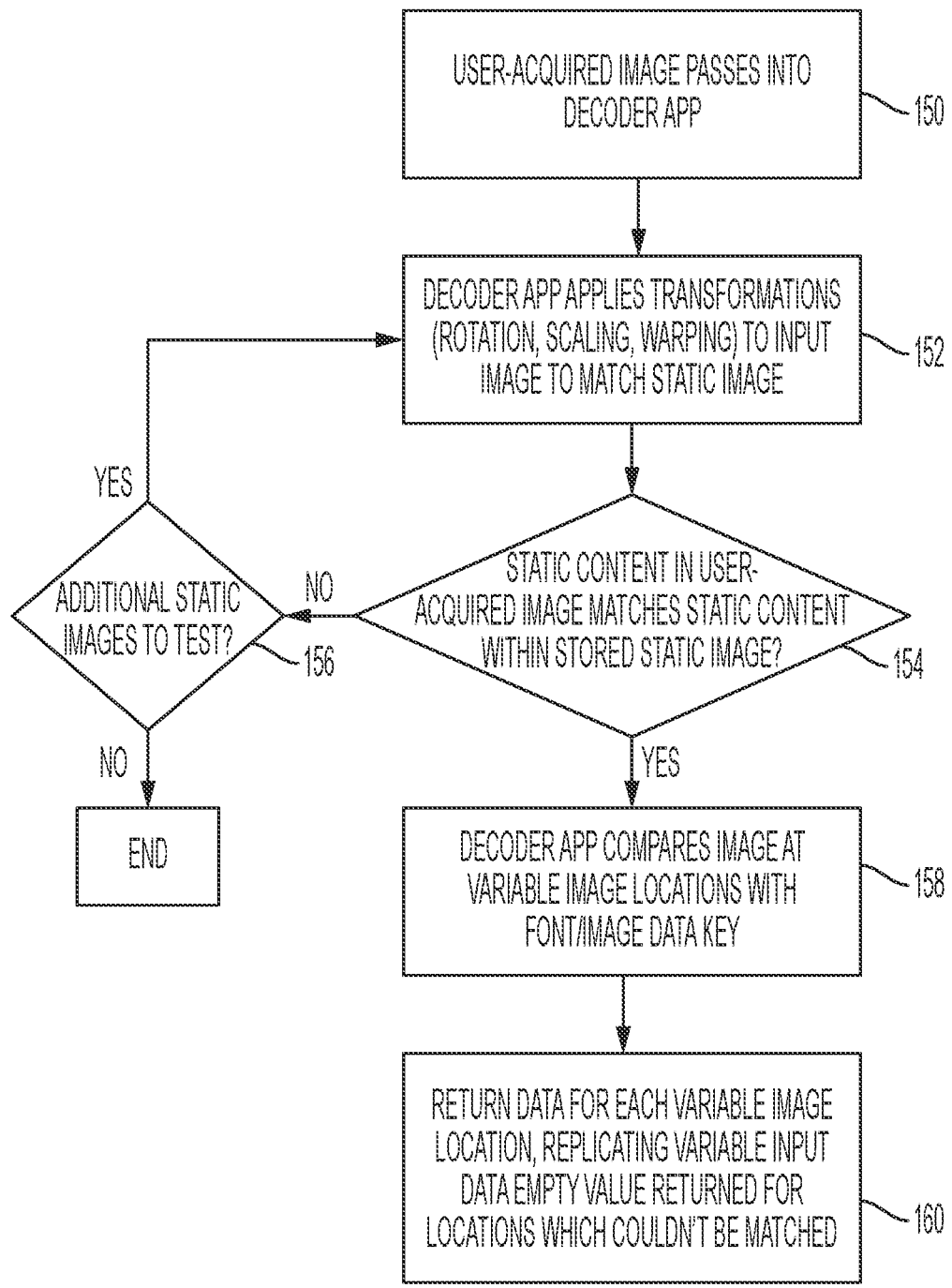
FIG. 2 illustrates a flow diagram of various methods herein.

FIG. 2 is a flowchart showing the processing that occurs within the decoder app as it operates on the user device when decoding the machine-readable code into the optional secure link. In greater detail in item 150, the user-acquired image passes into the decoder app.

In item 152, the decoder app matches static image content to a stored static image to provide proper scale, rotation, etc. Thus, in item 152 the image may be processed through a number of transformations (e.g., scaled, rotated, etc.) until the static image content matches a stored static image within the decoder app. This matching can ignore any image content at the variable data locations.

The decision box in item 154 determines whether the static content in user-acquired image matches the static content of the stored static image within the decoder app. If it does not, processing proceeds to item 156 to determine whether there are additional static images to test. If there are not additional static images to test, processing ends. However, if there are additional static images to test, processing returns to item 152 where the various transformations are performed on the additional static images.

If the static content in user-acquired image matches the static content of the stored static image within the decoder app in item 154, in item 158 the area corresponding to each variable data location is compared to a font image set (decoding key) to determine the best match of each image feature to each corresponding decoded value. The data at each location can be a single value (e.g., a single number linked to a circle of a given color in the input image), or a series of values (a name or address rendered in one of many standard security fonts). The output of the decoder app matches the variable data stream input by the designer when using the variable data printing app and could be a secure link that allows the user to securely communicate with a resource operated by the designer. As shown in item 160, the return data for each variable image location, replicates the variable input data (reproducing the secure link encoded by the designer) while empty values are returned for locations that could not be matched.

Figure 3:
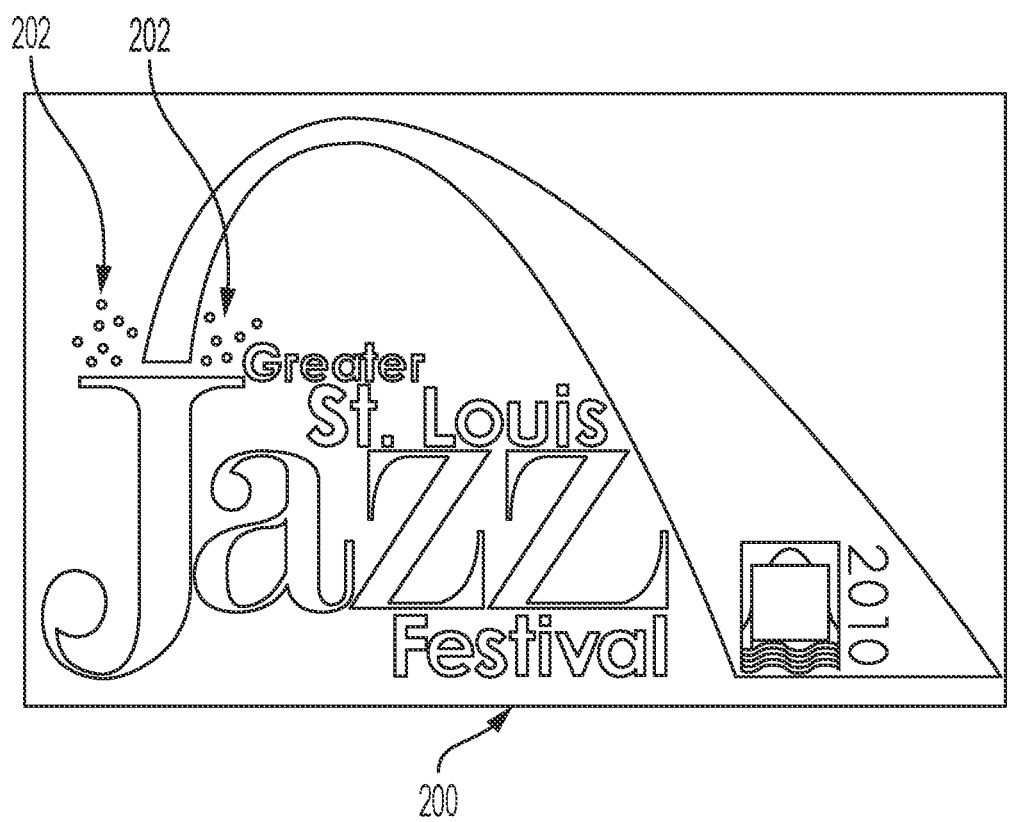
FIG. 3 is a schematic diagram illustrating printed products produced by systems and methods herein.

In one example shown in FIG. 3, a promotional poster 200 having a jazz festival logo includes, as part of the artwork, number of dots 202 of different colors above the J. These relative positions and colors of these dots 202 is a machine-readable code which decodes to an optional secure link.

When working with the variable data printing app, the designer creates a unique font, which maps alphanumeric values to circles of different sizes and colors. In the Jazz example shown in FIG. 3, the chosen font links numbers to images of circles of different colors as the machine-readable code 202. The variable data job includes a static image (e.g., the arc and text for the Jazz image in FIG. 3) and instructions to place a single letter at a specified location where the circles 202 are located in the image (e.g., at the top of the J in FIG. 2.) using, for example, the circle font. The variable data stream contains a value to be placed at each of the circle locations 202.

As noted above, while these dots 202 are visible and part of the artwork, codes are generally not human-readable. Specifically, while some skilled/trained humans may detect that there is a difference between color dot patterns in different printouts of the same image, humans would not be able to decode the color dot patterns into different data because such differences (and the data such differences represent) can be decodable only through a pixel-level analysis that correlates pixel markings (or lack thereof) with different data elements. Each X-Y location of individual pixels or groups of pixels represents a value or data classification and each color can represent a different value (e.g., 1-4 for cyan, magenta, yellow, black (CMYK) for example).

In other words, while some humans may be able to recognize that two patterns/colors of dots 202 are different, they would not be able to interpret what such differences mean, nor would they be able to decode these machine-readable codes 202 into data necessary to produce secure links to secure servers.

Figure 4:
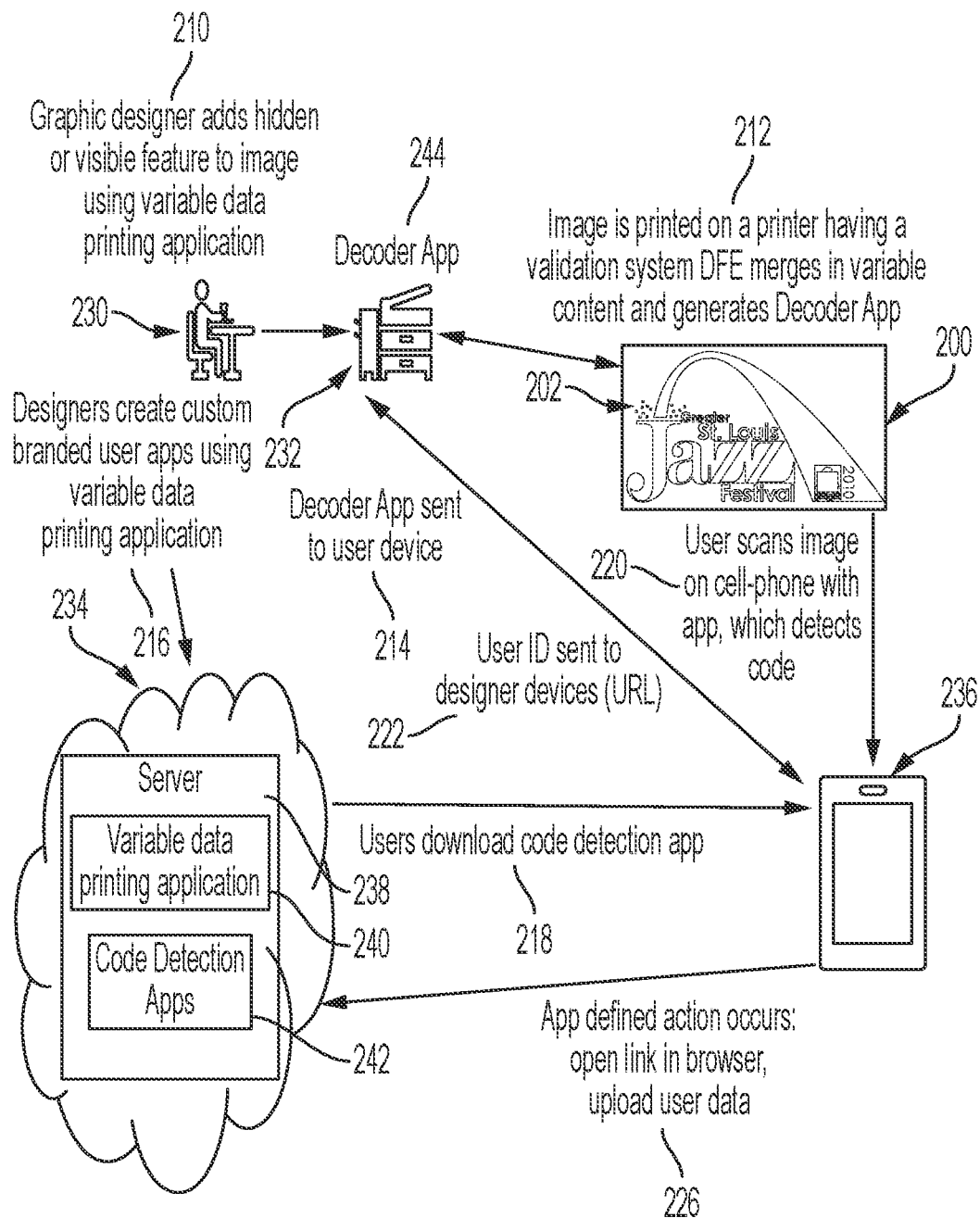
FIG. 4 is a schematic diagram conceptually illustrating processes performed by systems and methods herein.

FIG. 4 is a conceptual diagram illustrating some examples of using the systems and methods herein. As shown in item 210, a graphic designer 230 is provided access to a variable data printing app 240 (available from, for example, a computer network 234 connected server 238) to encode machine-readable codes into printable items, such as the machine-readable codes 202 in poster 200, also shown above in FIG. 3. The variable data printing app 240 can be resident on the server 238 or downloadable to the system of the designer devices 232. Further, the variable data printing app 240 is adapted to create a decoder app 244 that can be stored on designer devices 232.

The variable data printing app 240 interacts with other image creation programs and applications (e.g., graphic variable data printing app and systems) and allows designers 230 to add hidden or visible features to existing images which may or may not contain artwork. The variable data printing app 240 provides graphic designers 230 tools that can be used to create visible alphanumeric text or visible stand-alone artwork that form machine-readable codes and used to insert such items to other images. Further, the machine-readable codes can be in the form of distinct, stand-alone visible features (e.g., 202, FIG. 3) or hidden features that are blended in the background, included with other artistic designs, or are fully hidden (e.g., correlation marks, fluorescent marks, correlation marks, etc.). Thus, hidden features can include watermarks, holograms, micro-printing, with a requirement that, in some uses the hidden features must survive copying and image acquisition so that the machine-readable codes can be identified and decoded by apps 242 operating on user portable devices 236, such as smartphones, wristband scanners, ID badge scanners, document scanners, etc.

The designer devices 232 can include servers and printing devices. Such printing devices have a processor or digital front end (DFE). The printing devices print the printable item as a printed product 200. Each different printed product can have a unique machine-readable code 202 that is different from all other machine-readable codes and the DFE of the printing device 232 can create the decoding app 244 and transmit the decoding app 244 to the designer devices 232. More specifically, when the DFE of the printing device 232 handles merging of the machine-readable codes in variable printing fields of the printed products 200, the decoder app 244 can be created by the DFE and forwarded to the designer devices 232, as shown in item 212. Additionally, generation of the decoder app 244 can be performed by existing variable data printing applications as a new capability, the capability can be added to the DFE, or such generation can be a stand-alone application which reads in the variable data job description separately.

While the variable data printing app 240 is shown in the drawings as a single item, such is actually representative of a suite of products that perform many different actions, some of which are described herein. For example, the variable data printing app 240 provided by the server 238 can have additional tools that allows the designer 230 to create a code detection app 242 that is used to decode the machine-readable codes when captured by scanners, readers, or cameras of the user portable devices 236. Further, the variable data printing app 240 can include a user approval system that only provides the decoder app to the portable devices 236 if the user ID is verified. The code detection app 242 can be downloaded to user portable devices 236 as shown by item 218.

If a designer 230 creates the code detection app 242, it can be specific to an associated entity and can contain the target URL of the designer devices 232. In other implementations, the code detection app 242 can be generic and not specific to an individual designer 230 or entity and may not contain a pre-loaded target URL.

Thus, the tools of the variable data printing app 240 permit the designer 230 to provide a branded appearance to the look and feel of the code detection app 242, thereby making the code detection app 242 a custom product associated with an individual brand (shown in item 216. In some options, the functions of image acquisition, decoding, link generation, etc., can be consistent in all apps 242 designed using the variable data printing app 240. Each designer 230 provides necessary information in the code detection app 242 including, for example, keys to allow the machine-readable codes to be decoded, URLs or other network addresses of servers that the code detection app will contact to decode the encoded data strings, identification processes used to identify the machine-readable codes within images, user instructions, user fields, picture processing systems, etc.

As shown in item 218, users download the code detection app 242 to their portable devices 236. The users enter identifying information such as name, phone number, email, etc., into entry fields in the code detection app 242 operating on the user device 236 and such data is maintained by the code detection app on the portable user device 236. Item 222 shows that this information is sent to the designer devices 232 for user verification and, if a user is verified, that user device 236 receives the decoder app 244 from the designer devices 232 in return, as shown in item 214.

As shown in item 220, users can operate their portable devices 236 to capture images of the printed product 200 and the code detection app 242 operating on the user device 236 recognizes and decodes the machine-readable codes 202 in the printed product 200 into an optional secure link using the decoding app 244.

Item 226 shows that the now available secure link can be used to perform any code detection app defined action, such as opening a link in browser, uploading user data, cell-phone number, etc. Thus, the code detection app 242 operating on the user device 236 performs some action using the secure link. In one example, the code detection app 242 operating on the user device 236 forwards the user identifying information and possibly information identifying the printed product 200 to the server to allow the user to participate in a rewards game, gain access to a festival, verify a ID badge, track blocks of document images, etc.

Figure 5:
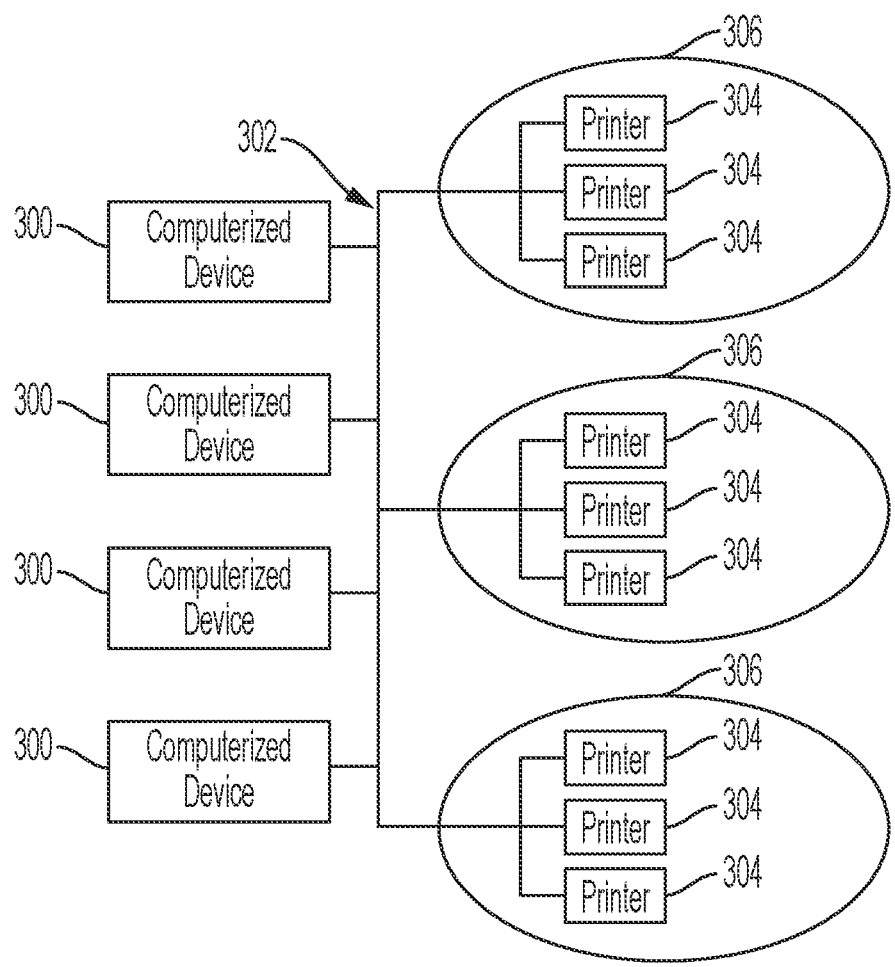
FIG. 5 is a schematic diagram illustrating systems herein.

As shown in FIG. 5, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 6:
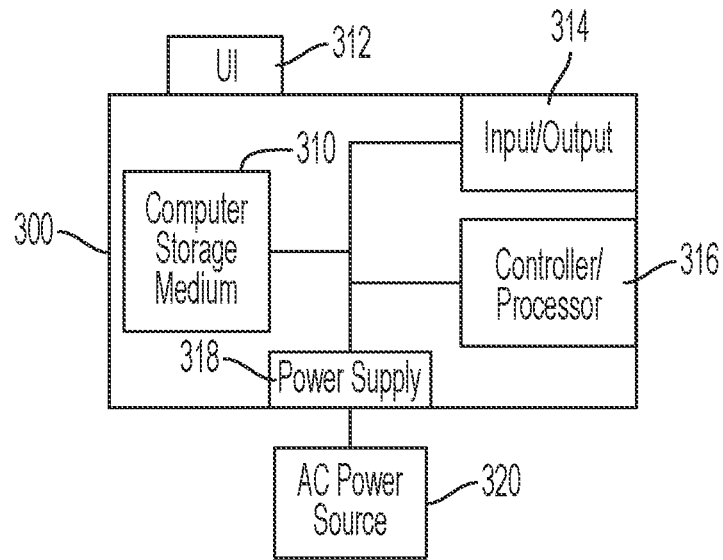
FIG. 6 is a schematic diagram illustrating devices herein.

FIG. 6 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 6, a body housing has one or more functional components that operate on power supplied from an alternating current (AC) source 320 by the power supply 318. The power supply 318 can comprise a common power conversion unit, power storage element (e.g., a battery, etc.), etc.

Figure 7:
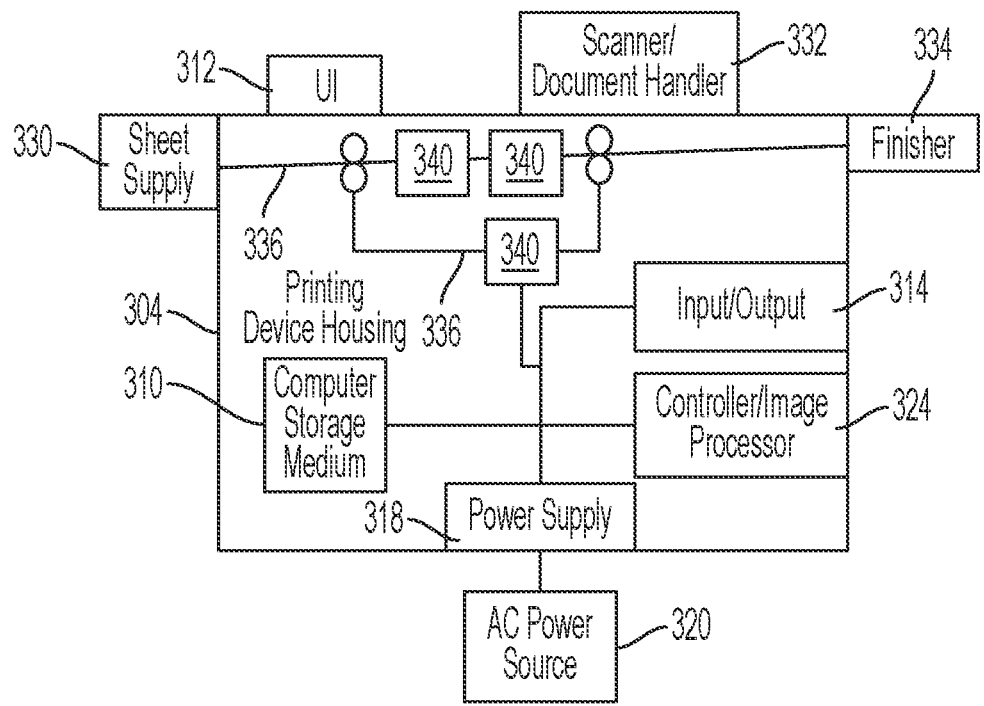
FIG. 7 is a schematic diagram illustrating devices herein.

FIG. 7 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing app(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing app(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing apps 340 are intended to illustrate any marking device that applies a marking material (toner, inks, etc.) to continuous media or sheets of media, whether currently known or developed in the future and can include, for example, devices that use an ink jet imaging system or a high-speed aqueous imaging system.

Thus, system embodiments herein include a variable data printing app and a decoder app that are adapted to be maintained on a computer server 300. The variable data printing app is adapted to be accessed by designer devices, add machine-readable code to printable items while operating on the designer devices, and create a decoder app that is capable of decoding the machine-readable code (while operating on the designer devices). The variable data printing app is adapted to be accessed by designers using the designer devices preparing the printable items.

The variable data printing app is adapted to add the machine-readable codes to the printable items according to the designers' instructions prior to printing the printable items. The machine-readable code can be non-visible (unreadable by unaided human vision) or can be visible and may form part of decorative elements of the printable items. The printable items are variable information print jobs, and the machine-readable codes are in variable content locations of the variable information print jobs.

The code detection app is adapted to be accessed by user devices, receive user identification information while operating on the user devices, and transmit the user identification information to the designer devices while operating on the user devices. The designer devices validate a user device based on the validity of the user identification information transmitted by the user device. The printable items are adapted to be physically printed as printed products.

The user devices are adapted to capture at least one user-acquired image of at least one of the printed products. The code detection app, operating on the user device, is adapted to optionally decode the machine-readable code in the user-acquired image into a secure link with the designer devices using the decoder app. The code detection app is further adapted to exchange information from the user device to the designer devices using the secure link.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing apps, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the term "app" (or "application") describes one or more methodologies or processes performed using computerized devices and such apps can be embodied in software, firmware, hardware, etc. Therefore, apps herein are one or more sets of instructions embodied in languages machines can understand that direct a computerized device to perform or stop some action. The apps herein can, for example: direct computerized devices to display items on user interfaces that users can interact with; direct computerized devices to communicate with and transfer data between other devices over computerized networks; direct processes to automatically begin or end and direct the computerized devices to perform each of the individual steps of such processes automatically; direct computerized devices to store data, delete data, perform computations using data, etc.; and/or direct computerized devices to set and monitor timers; etc.

In addition, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    providing access to a variable data printing app on at least one computer server, wherein the variable data printing app is adapted to:
        be accessed by designer devices;
        add machine-readable code to printable items while operating on the designer devices; and
        create a decoder app adapted to decode the machine-readable code while operating on the designer devices; and
    providing access to a code detection app on the computer server, wherein the code detection app is adapted to:
        be accessed by user devices; and
        receive user identification information while operating on the user devices,
    wherein the designer devices validate a user device based on validity of the user identification information transmitted by the user device,
    wherein the variable data printing app is adapted to transmit the decoder app to validated ones of the user devices while operating on the designer devices,
    wherein the printable items are adapted to be physically printed as printed products,
    wherein the user devices are adapted to capture at least one user-acquired image of at least one of the printed products, and
    wherein the code detection app, operating on the user device, is adapted to decode the machine-readable code in the designer devices using the decoder app.

2. The method according to claim 1, wherein the code detection app is adapted to decode the machine-readable code into a secure link with the designer devices.

3. The method according to claim 2, wherein the code detection app is adapted to exchange information from the user device to the computer server using the secure link.

4. The method according to claim 1, wherein the machine-readable code forms part of decorative elements of the printable items.

5. The method according to claim 1, wherein the variable data printing app is adapted to be accessed by designers using the designer devices preparing the printable items, wherein the variable data printing app is adapted to add the machine-readable code to the printable items according to instructions of the designers prior to printing the printable items.

6. The method according to claim 1, wherein the printable items comprise variable information print jobs, and wherein the machine-readable code is in variable content locations of the variable information print jobs.

7. The method according to claim 1, wherein the machine-readable code is unreadable by unaided human vision.

8. A method comprising:
    providing access to a variable data printing app on at least one computer server, wherein the variable data printing app is adapted to:
        be accessed by designer devices;
        add machine-readable code to printable items while operating on the designer devices;
        create a decoder app adapted to decode the machine-readable code while operating on the designer devices;
    providing access to a code detection app on the computer server, wherein the code detection app is adapted to;
        be accessed by user devices; and
        receive user identification information while operating on the user devices;
    printing the printable items as printed products using printing equipment in communication with the designer devices; and
    verifying the machine-readable code within the printed products using the printing equipment,
    wherein the designer devices validate a user device based on validity of the user identification information transmitted by the user device,
    wherein the variable data printing app is adapted to transmit the decoder app to validated ones of the user devices while operating on the designer devices,
    wherein the user devices are adapted to capture at least one user-acquired image of at least one of the printed products, and
    wherein the code detection app, operating on the user device, is adapted to decode the machine-readable code in the user-acquired image using the decoder app.

9. The method according to claim 8, wherein the code detection app is adapted to decode the machine-readable code into a secure link with the designer devices.

10. The method according to claim 9, wherein the code detection app is adapted to exchange information from the user device to the designer devices using the secure link.

11. The method according to claim 8, wherein the machine-readable code forms part of decorative elements of the printable items.

12. The method according to claim 8, wherein the variable data printing app is adapted to be accessed by designers using the designer devices preparing the printable items, wherein the variable data printing app is adapted to add the machine-readable code to the printable items according to instructions of the designers prior to printing the printable items.

13. The method according to claim 8, wherein the printable items comprise variable information print jobs, and wherein the machine-readable code is in variable content locations of the variable information print jobs.

14. The method according to claim 8, wherein the machine-readable code is unreadable by unaided human vision.

15. A system comprising:
    a variable data printing app, wherein the variable data printing app is adapted to:
        be maintained on a computer server;
        be accessed by designer devices;
        add machine-readable code to printable items while operating on the designer devices; and
        create a decoder app adapted to decode the machine-readable code while operating on the designer devices; and
    a code detection app, wherein the code detection app is adapted to;

be maintained on the computer server;

be accessed by user devices;

receive user identification information while operating on the user devices; and transmit the user identification information to the designer devices while operating on the user devices, wherein the designer devices validate a user device based on validity of the user identification information transmitted by the user device, wherein the variable data printing app is adapted to transmit the decoder app to validated ones of the user devices while operating on the designer devices, wherein the printable items are adapted to be physically printed as printed products, wherein the user devices are adapted to capture at least one user-acquired image of at least one of the printed products, and wherein the code detection app, operating on the user device, is adapted to decode the machine-readable code in the user-acquired image using the decoder app.

16. The system according to claim 15, wherein the code detection app is adapted to decode the machine-readable code into a secure link with the designer devices.

17. The system according to claim 16, wherein the code detection app is adapted to exchange information from the user device to the designer devices using the secure link.

18. The system according to claim 15, wherein the machine-readable code forms part of decorative elements of the printable items.

19. The system according to claim 15, wherein the variable data printing app is adapted to be accessed by designers using the designer devices preparing the printable items, wherein the variable data printing app is adapted to add the machine-readable code to the printable items according to instructions of the designers prior to printing the printable items.

20. The system according to claim 15, wherein the printable items comprise variable information print jobs, and wherein the machine-readable code is in variable content locations of the variable information print jobs.

* * * * *